April 19, 1960

S. B. COHEN ET AL 2,933,059

SHIPBOARD DEGAUSSING SYSTEM

Filed Oct. 28. 1953

INVENTORS
SIDNEY B. COHEN
RICHARD SCHEIB, JR.
BY VICTOR VACQUIER

ATTORNEY

INVENTORS
SIDNEY B. COHEN
RICHARD SCHEIB, JR.
VICTOR VACQUIER
ATTORNEY

United States Patent Office 2,933,059
Patented Apr. 19, 1960

2,933,059

SHIPBOARD DEGAUSSING SYSTEM

Sidney B. Cohen, Bayside, and Richard Scheib, Jr., New Hyde Park, N.Y., and Victor Vacquier, Socorro, N. Mex., assignors to Sperry Rand Corporation, a corporation of Delaware Application October 28, 1953, Serial No. 388,716

17 Claims. (Cl. 114—240)

This invention relates to shipboard degaussing systems and, particularly, to improvements in such systems to compensate automatically for the changes in a ship's magnetic field that are caused by the rolling, pitching and yawing motions of the ship.

Heretofore, in order to protect a ship against magnetic mines it was customary first, to determine the magnetic field of the ship, second to equip the ship with one or more degaussing coils arranged when suitably energized to neutralize the ship's field, and then, to prescribe the currents required to be applied to such coils, in accordance with the ship's magnetic history and its geographic position and heading. This type of installation was widely used in World War II and provided adequate protection against certain types of magnetic mines. However, this procedure made no attempt to compensate for magnetic field changes caused by changes in attitude of the ship and, thus, did not afford protection against more sensitive mines.

The principal object of the present invention is automatically to furnish the correct current to a ship's degaussing coils as a function of the orientation of the ship with respect to the earth's magnetic field. A further object of the present invention is to effect complete neutralization of the magnetic field of a ship regardless of the attitude of the ship. A further object of the invention is to compute the required degaussing current in accordance with the instantaneous values of heading, roll and pitch of the ship. Further objects of the invention will be apparent throughout the specification.

Briefly, these objects are attained by reproducing the relationship of the ship and the magnetic field of the earth in its immediate vicinity, and continuously computing the required degaussing current in accordance with the instantaneous variations in such relationship. Specifically, this is accomplished by producing an alternating current electric field having horizontal and vertical components proportional to the corresponding components of the earth's magnetic field in the ship's vicinity, stabilizing such electric field relative to the magnetic meridian and to the horizontal, and placing inductive pick-off devices in said field that are fixed with respect to the ship and correspond in number and orientation to the ship's degaussing coils. With this arrangement, any motion of the ship results in a corresponding motion of the pick-off devices relative to the stabilized electric field, whereby a voltage is induced in each pick-off device that is proportional to the current required in the corresponding degaussing coil to neutralize the induced magnetic field about the corresponding axis of the ship. Each such voltage is combined with another voltage that is proportional to the current required to neutralize the ship's permanent magnetic field about the same axis, and the several total voltages are suitably amplified and applied to control the outputs of associated motor generator sets to supply the required currents to the corresponding degaussing coils.

A preferred form of the invention is shown in the drawings, in which:

Figs. 1 and 2 comprise a schematic diagram of the principal electrical and mechanical components of the invention;

Figure 1:
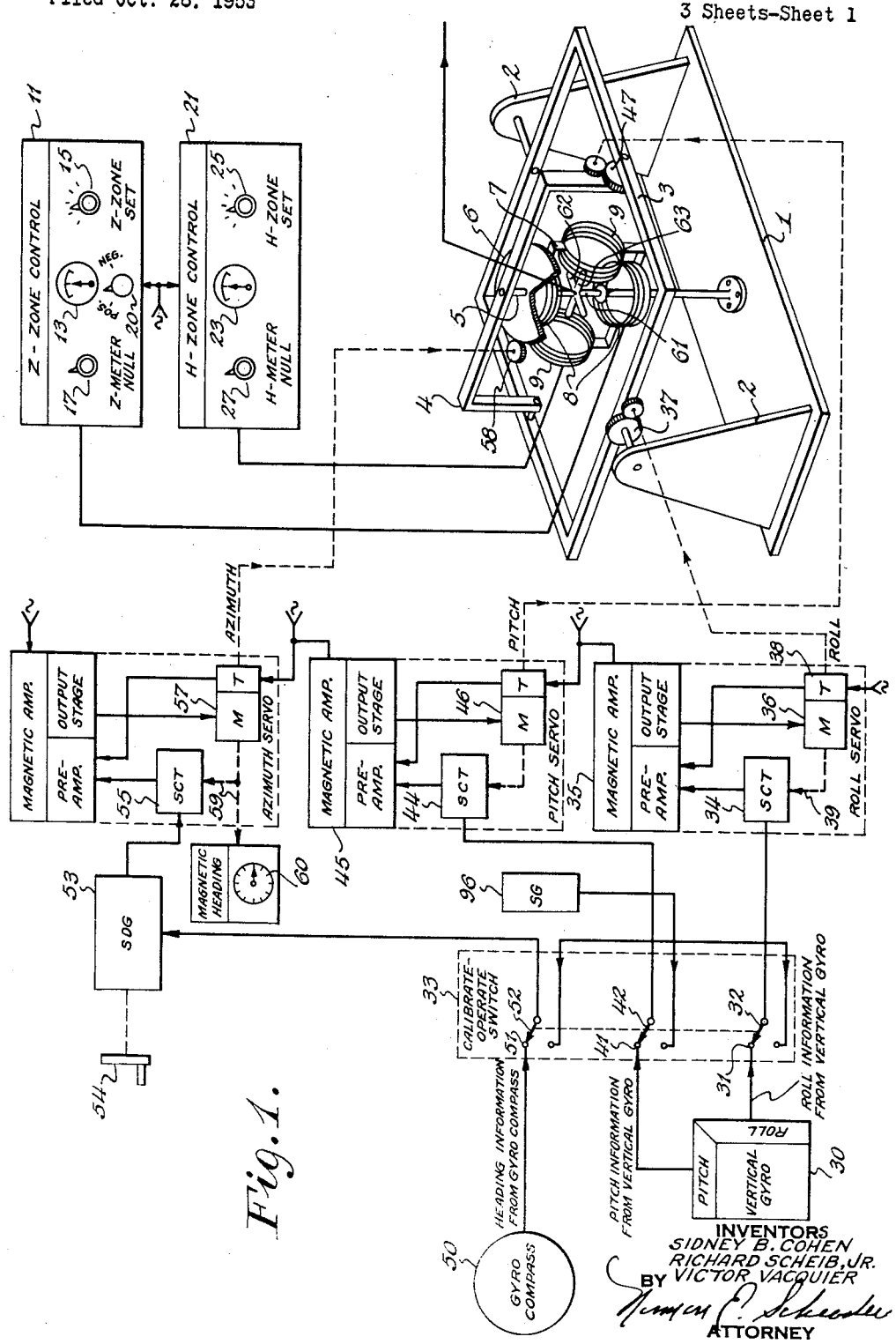

The basic problem of the protection of ships against magnetic mines is considered well-known and is described in a number of papers (see for example, "Shipboard Degaussing Installations for Protection Against Magnetic Mines" by Nicholas B. Michel of the Bureau of Ships in Transactions of the American Institute of Electrical Engineers, volume 67, part II, page 1270 et seq.). Therefore, a brief review of the problem is considered adequate to an understanding of the present invention.

Although a variety of types of magnetic mines were used during World War II, each included a sensitive element which, when the mine was laid and armed, was aligned with the flux lines of the earth's magnetic field in its immediate vicinity. This sensitive element was adapted to be moved, upon a disturbance of the earth's field, to engage a contact that completed a circuit to detonate the mine. In general, any steel ship passing in the vicinity of the mine caused sufficient disturbance of the earth's field to actuate the sensitive element. Inasmuch as these mines were usually laid in relatively shallow water and rested on the ocean bed, they could not be destroyed by the minesweeping techniques then in use. Thus, the only effective defense against such mines was to neutralize the ship's magnetic field so that it not affect the sensitive element of the mine.

Investigations of the problem disclosed that the ship's magnetic field comprised both permanent and induced magnetic components. The permanent magnetism is that which is taken on by the ship's steel while the ship is being constructed in the presence of the earth's field, and is retained independently of the earth's field conditions until it decays. The induced magnetism, which forms the larger portion of the ship's field, is that induced in the ship's steel by the earth's magnetic field, and varies in accordance with the ship's geographical location and orientation in the earth's field. It was also found that the intensities of each type of magnetism coud be determined at specially constructed degaussing stations and could be resolved, in general, into components along the ship's vertical, longitudinal, and athwartship axes. It was also found that various combinations of coils of heavy cables, termed "degaussing" coils, could be arranged about such axes and energized with direct current to create opposing magnetic fields to neutralize the effect of the ship's field.

Basically, these degaussing coils were of three main types, as follows:

M-coil—arranged in a loop just inside the skin of the hull in a plane substantially at the water line, to neutralize the vertical component of the ship's magnetic field;

L-coil—comprising a series of loops arranged about the longitudinal axis of the ship and arranged in planes perpendicular to such axis, to neutralize the longitudinal component of the ship's field;

A-coil—comprising one or more loops arranged in a plane perpendicular to the athwartship axis, to neutralize the athwartship component.

A variety of other coils, known as Q and F, QI and FI, QP and FP and various auxiliary coils, were used as substitutes for or to supplement the effects obtained from the M-, L- and A-coils because of structural difficulties of installation or peak fields that were found to exist.

For the purpose of this description, the M-, L- and A-coils are considered as capable of providing the required neutralizing fields. However, it will be apparent that the present invention is equally applicable to any arrangement of degaussing coils, regardless of number or orientation.

When a ship was equipped with a suitable degaussing coil installation, it was calibrated at a degaussing station and provided with a schedule that specified the currents to be applied to each of its degaussing coils, at any point on the earth's surface, in accordance with its geographic position and heading. These currents were obtained from the ship's generating equipment and were controlled and varied manually by a degaussing watch.

During the early stages of the war, this degaussing technique was quite effective as a passive defense because the mines originally used by the enemy were of relatively low sensitivity. As the sensitivity of these mines was improved, it was found increasingly difficult to provide effective neutralization of the ship's field. Therefore, special minesweepers were developed to destroy the mines prior to a ship's passage thereover.

These minesweepers had hulls and engines constructed almost entirely of non-magnetic material, to cause as little disturbance of the earth's field as possible, and were arranged to tow an assembly of heavy cables that were energized to create a strong, random magnetic field far to the stern of the ship. The field thus created was effective in most instances to create a disturbance sufficient to detonate the mines. However, as the sensitivity of the mines was increased still further, it was found that the minesweepers, by themselves, created a sufficient magnetic field to detonate the mines. This field was primarily caused by the generating equipment required to energize the towed coil. Although it was reduced to a great extent by applying conventional degaussing techniques, it was found that the variations in the ship's induced magnetic field caused by changes in attitude of the ship were sufficient to detonate the more sensitive mines. Therefore, it became essential to provide means to vary the degaussing coil currents automatically to maintain complete neutralization of the ship's induced magnetic field despite any rolling, pitching, or yawing motions of the ship.

From a vector solution of the problem it can be shown, in the general case, that the several components of the induced magnetic field of a ship vary directly with variations in the vertical and horizontal components of the earth's magnetic field and with variations in the magnetic heading, roll and pitch angles of the ship. Specifically, and by way of example herein, it can also be shown that if H and Z are currents proportional to the horizontal and vertical components of the earth's field, and $a$, $r$, and $p$ are, respectively, the magnetic heading, roll and pitch angles of the ship, then the currents $I_M$, $I_L$, $I_A$, which are required to be applied to the degaussing coils M, L and A to effect neutralization of the ship's induced magnetic field when the ship is on a north magnetic heading and in a level attitude, must be varied in accordance with the following relations to maintain neutralization of the ship's field for any other values of magnetic heading, pitch and roll:

$$I_M \propto Z \cos r \cos p + H \cos a \sin p \cos r - H \sin a \sin r \quad (1)$$

$$I_L \propto -Z \sin p + H \cos a \cos p \quad (2)$$

$$I_A \propto Z \sin r \cos p + H \cos a \sin p \sin r + H \sin a \cos r \quad (3)$$

In order to obtain a solution for the foregoing equations, the present invention provides an analogue-type, degaussing current computer wherein A.-C. fields proportional to the horizontal and vertical components of the earth's magnetic field are established and stabilized so that the resultant field is fixed with respect to the earth and remains parallel to the magnetic meridian, and wherein a plurality of mutually perpendicular inductive pick-up devices, which correspond in number and orientation to the ship's degaussing coils, are arranged to move in this field in accordance with movements of the ship, whereby voltages are induced therein that are proportional to the currents required in the corresponding degaussing coils. For convenience, the A.-C. fields proportional to the horizontal and vertical components of the earth's magnetic field are referred to as the H-zone and Z-zone, respectively.

Figure 2:
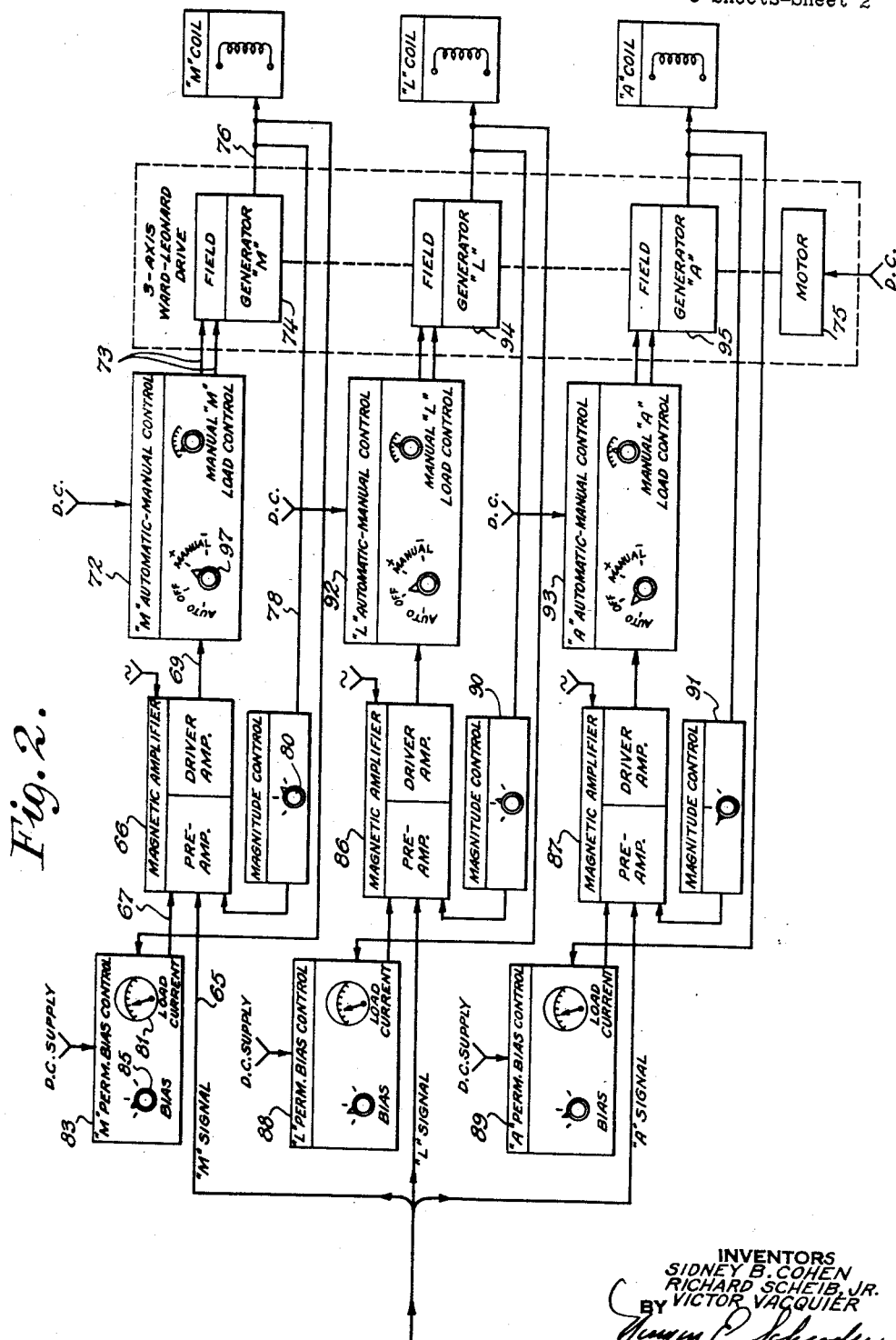

A preferred embodiment of such a computer and the system with which it functions is disclosed schematically in Figs. 1 and 2. The computer itself is mounted on a base plate 1 that is secured to the ship and is provided with vertical end plates 2 which support a gimbal ring 3 for rotation about an axis parallel to the longitudinal or roll axis of the ship. A bail 4 is supported on suitable bearings mounted on gimbal 3 for rotation about the athwartship or pitch axis of the ship and is provided with a stud 5 which supports a turntable 6 mounted for rotation relative thereto.

Fixed to turntable 6 is a framework 7 which serves to support two sets of Helmholtz coils 8 and 9 with their axes at right angles about a common center. These coils are energized, as described below, to form uniform, mutually perpendicular, A.-C. fields having lines of force at the center of the fields as straight as possible. Although framework 7 is shown schematically in Fig. 1, it is understood that it should be made of materials having a dielectric constant as near to air as possible in order to avoid distortion in the fields established by the coils. For example, the coils may be wound on Teflon forms and mounted in a mahogany frame, since both of these materials have suitably low dielectric characteristics.

Figure 3:
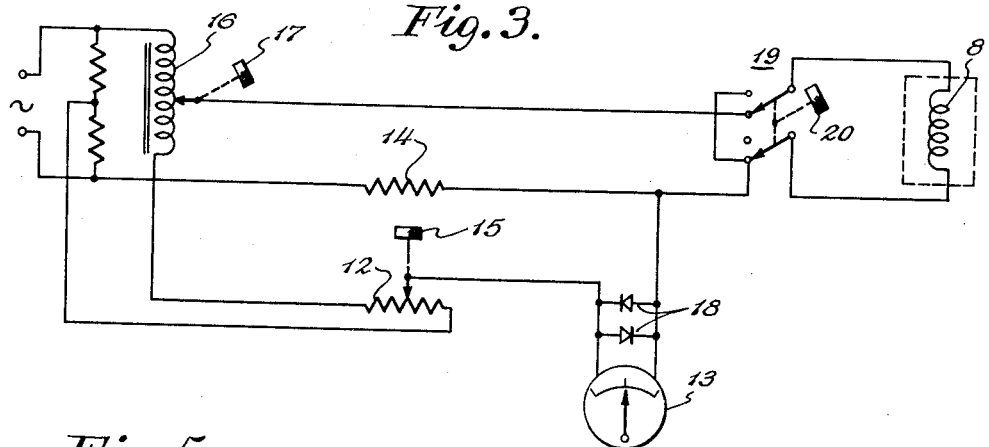
Fig. 3 is a schematic diagram of the field control circuits of the invention.

To establish an electric field proportional to the vertical component of the earth's magnetic field, coils 8 are energized from a suitable A.-C. source through a potentiometer located in Z-zone control unit 11. Inasmuch as the vertical component of the earth's field varies from zero milligauss at the magnetic equator to approximately 600 milligauss at the magnetic poles, the Z-zone control must provide accurate calibration throughout this entire range. For this purpose, an accurate potentiometer or helipot 12 (see Fig. 3) is used as a reference in setting the correct current through coils 8. A null meter 13 reads zero when the voltage drop across a zero temperature coefficient resistor 14 equals the voltage set by helipot 12. The voltage drop across resistor 14 is proportional to the current across coils 8.

To operate the Z-zone control, helipot 12 is adjusted by a knob 15 to a desired value and the null meter control variac 16 is adjusted by a knob 17 to obtain a zero reading on null meter 13. Rectifiers 18 are provided to protect meter 13 from overload. Inasmuch as the polarity of the vertical component of the earth's magnetic field reverses in the southern hemisphere, a reversing switch 19 operated by a knob 20 is provided to reverse the polarity of the field in coils 8 when the ship crosses the magnetic equator. In order to set the Z-zone control at its proper value, knob 15 is read against a dial that is calibrated in milligauss from zero to 600 and settings are made manually as prescribed by standard charts of vertical magnetic intensity, in accordance with the ship's geographic position.

In a similar manner, coils 9 are energized proportionally to the horizontal component of the earth's magnetic field through an H-zone control unit 21 that is provided with essentially the same circuitry as control unit 11, namely, a helipot setting control 25 and a temperature compensation control 27 that is adjusted by reference to a null meter 23. Inasmuch as the horizontal component of the earth's field does not reverse polarity and varies from zero milligauss at the poles to 410 milligauss at the magnetic equator, no reversing switch is required and setting control 25 is associated with a dial calibrated from zero to 410 milligauss, to provide the necessary adjustments required for the horizontal component of the earth's magnetic field.

It may be noted that field coils 8 and 9 may be energized by direct current, if desired, or that magnetic fields may be employed instead of electric fields. However, alternating current electric fields are preferred since they are less subject to interference from the earth's magnetic field.

In order to stabilize field coils 8 and 9 with respect to the horizontal, despite rolling and pitching motions of the ship, gimbal 3 and bail 4 are positioned in conventional manner by error signals obtained from the ship's vertical gyro 30. For this purpose, the signal obtained from the synchro generator of the vertical gyro roll pick-off is fed through contact 31 and armature 32 of a "calibrate-operate" switch 33, described below, to the stator of synchro control transformer 34. The resulting signal is then fed to the input of magnetic amplifier 35, the output of which is applied to servo motor 36 which, through suitable gearing 37, is effective to position gimbal 3 to maintain a horizontal position despite rolling motion of the ship. Servo motor 36 also functions, in conventional manner, to drive a tachometer 38 to apply a stabilizing signal to amplifier 35, and to position the rotor of control transformer 34, by means of shaft 39, to zero its output when positional agreement of gimbal 3 and the vertical gyro pick-off is attained.

In the same manner, the vertical gyro pitch error signal is transmitted through contacts 41 and armature 42 of switch 33, synchro control transformer 44, amplifier 45 and servo motor 46 whereby, through gearing 47, bail 4 is maintained in a vertical position despite pitching motion of the ship. Although synchros 34 and 44 and servo motors 36 and 46 are shown in conventional block diagram form, it is understood that in practice these elements are associated with the respective gimbal and bail in the usual manner. It may also be noted that any suitable type of amplifying device may be used in the present system. However, since this apparatus is intended for use primarily on board a minesweeper, magnetic amplifiers are preferred throughout the equipment since they are better adapted to withstand shocks caused by the detonation of mines in the near vicinity.

In order to stabilize field coils 8 and 9 in the magnetic meridian, despite yawing and turning movements of the ship, turntable 6 is positioned in accordance with error signals obtained from the ship's gyro compass 50, as modified for variations in magnetic declination. For this puropse, the signal obtained from the gyro compass pick-off is fed through contact 51 and armature 52 of switch 33 to the stator of synchro differential generator 53, the rotor of which is manually positioned in magnetic declination, by means of handle 54, as prescribed by standard magnetic declination charts in accordance with the ship's geographic position. The resulting signal is fed through synchro control transformer 55 and magnetic amplifier 56 to control the operation of servo motor 57 which, through gear 58 which meshes with a gear on turntable 6, serves to position turntable 6 to maintain field coils 9 aligned with the magnetic meridian. Servo motor 57, through shafting 59, functions in the usual manner to zero the output of synchro control transformer 55, and also serves to position the indicator of a heading meter 60 to provide a visual indication of the magnetic heading of the ship.

By means of the arrangement thus far described, there are provided electric fields proportional to the horizontal and vertical components of the earth's magnetic field that are stabilized with respect to the magnetic meridian and to the horizontal. In order to obtain signals proportional to the required degaussing currents, inductive pick-off devices are arranged in said fields. These pick-off devices must be fixed with respect to the ship and must correspond in number and arrangement to the degaussing coils that are to be controlled.

Figure 4:
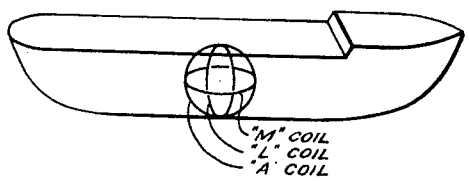
Fig. 4 is a schematic view of a typical arrangement of degaussing coils on a minesweeper.

For simplicity of explanation, it may be assumed that on a minesweeper the degaussing equipment is required only to neutralize the field created by the generating apparatus, and that the M-, L-, and A-coils may be arranged concentrically about mutually perpendicular axes to encircle such apparatus, as shown in Fig. 4, to obtain the most effective results. With such an arrangement of degaussing coils, the pick-off devices for the degaussing current computer may comprise elements 61, 62, and 63 (see Fig. 1), each of which consists of two series connected coils of wire wound at opposite ends of a Teflon rod that has its axis aligned with the axis of a corresponding degaussing coil, and all of which are orthogonally mounted on a pedestal 64, secured to base plate 1, to have a common center coincident with the common center of field coils 8 and 9.

This arrangement, in which elements 61, 62, and 63 function as the pick-off devices for the M-, L-, and A-coils, respectively, duplicates the relationship of the ship's degaussing coils with respect to the earth's magnetic field, and provides a device in which the voltage variations induced in the respective elements 61, 62 and 63, as the result of the rolling, pitching and yawing motions of the ship, are exactly proportional to the ratios established in Equations 1, 2 and 3, above. Therefore, these voltage signals may be employed to vary the currents supplied to the degaussing coils in direct proportion and thereby compensate for variations in the induced component of the magnetic field of the ship.

It may be noted that pick-off devices 61, 62 and 63 could be constructed in the form of individual coils orthogonally arranged about a common center. However, the arrangement disclosed is considered more advantageous since it provides for the cancellation of the small radial components of the A.-C. field (i.e., the divergence of the uniform field) from each pair of excitation coils. Furthermore, although the pick-off devices are orthogonally arranged in the particular embodiment disclosed, it is apparent that they may be arranged in any other suitable manner depending upon the orientation of the degaussing coils employed in a given installation. The only requirement being that the axis of each pick-off coil be substantially perpendicular to the plane of its associated degaussing coil.

The individual voltage signals obtained from pick-offs 61, 62 and 63 are fed from the degaussing current computer through suitable slip rings (not shown) to separate control channels, wherein they are amplified by a magnetic amplifier and a motor-generator set to produce the desired level of load current for the respective degaussing coils. Inasmuch as the several control channels are identical, a description of the M-coil control is considered illustrative of the L- and A-coil controls, as well.

Figure 5:
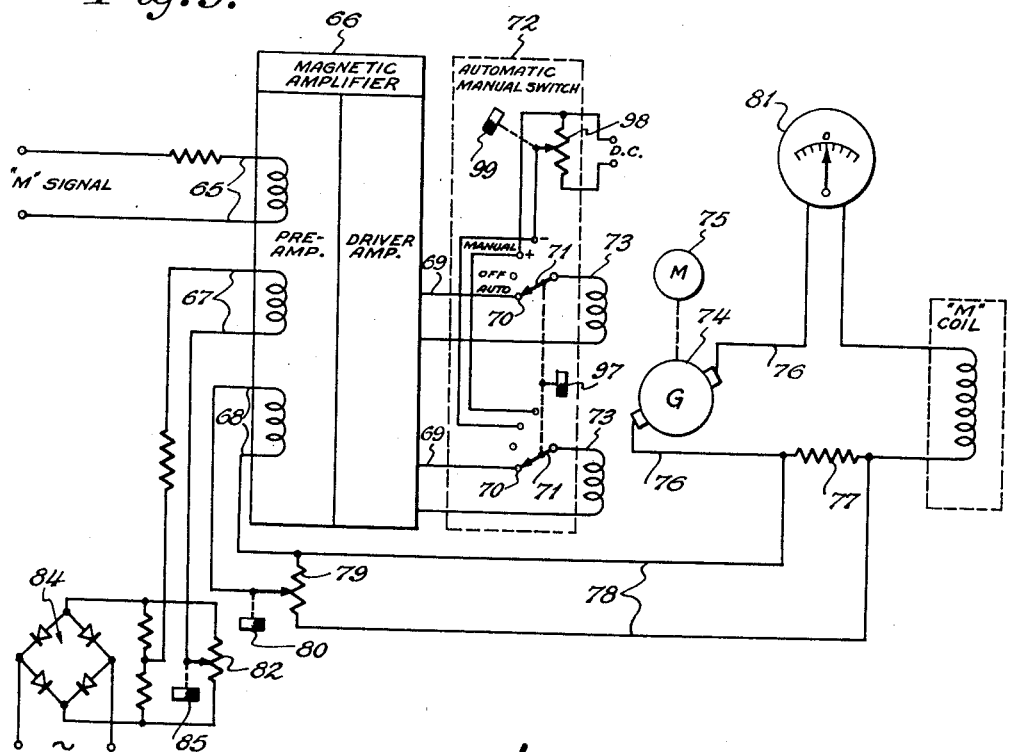
Fig. 5 is a schematic diagram of the control signal amplifying channel for the M-coil.

In the M-coil channel the low-level signal from pick-off element 61 (Fig. 1) is fed on lead 65 (see Figs. 2 and 5) to the preamplifier stage of magnetic amplifier 66 wherein it is combined with a constant level signal, received on lead 67, that is proportional to the permanent bias current that is desired in the M-coil. In addition, the combined signal is compared with a feedback signal, received on lead 68, that is proportional to the load current delivered to the M-coil. The resulting signal is demodulated and amplified in the driver stage of amplifier 66 and fed, on leads 69, through contacts 70 (marked "Auto") and wiper arms 71 of automatic-manual switch 72, described below, and leads 73 to the field coils of generator 74 of a conventional three-axis Ward-Leonard motor-generator set that is driven by motor 75. By this arrangement, the current output of the generator is varied proportionally to the total control signal and is applied, by leads 76, directly to the M-coil of the ship.

Inasmuch as the current output of a Ward-Leonard system is not conveniently predictable with respect to the voltage signal applied to its field coils, a feedback loop is provided to produce the required linear input-output characteristic of the overall amplifier system. For this purpose, a resistor 77 is inserted in lead 76 to provide a signal proportional to the current applied to the M-coil. This signal is fed, on leads 78, to a magnitude control potentiometer 79, the output of which is fed to amplifier 66 to oppose the combined induced and permanent magnetism control signals. By manipulation of setting knob 80, potentiometer 79 may be adjusted so that for a predetermined control signal the current prescribed by the ship's degaussing schedule may be applied to the M-coil, and is suitably indicated on ammeter 81.

The constant bias control signal required to effect neutralization of the permanent magnetic component of the ship's field along its vertical axis is provided by a potentiometer 82 that is mounted in permanent bias control unit 83 and is energized from the ship's A.-C. supply through a rectifier unit 84. The output of potentiometer 82 is adjusted by a setting knob 85 and is fed to amplifier 66 on leads 67, as mentioned above, and is combined with the variable output from the degaussing current computer. This arrangement provides for a variable D.-C. signal that is adjusted in accordance with the ship's degaussing schedule when the system is calibrated and remains constant thereafter. In order to check the permanent bias signal level, the output of the degaussing current computer is reduced to zero by deenergizing field coils 8 and 9, and the current output of motor-generator set 75, in response to the permanent bias signal, is read independently on ammeter 81 which is mounted on control unit 83 for convenience.

The L- and A-coil control channels are identical to the M-coil channel and, therefore, need not be described in detail. In each case, a variable control signal from the respective pick-off element 62 (or 63) of the degaussing current computer is combined in amplifier 86 (or 87) with a constant control signal from permanent bias control 88 (or 89) and compared with a feedback signal that is adjusted by magnitude control 90 (or 91). The resulting signal is passed through automatic-manual switch 92 (or 93) to the field coils of generators 94 (or 95) of the motor-generator set, whereby the current applied to the L-coil (or A-coil) varies directly in proportion to the variations of the voltage induced in pick-off element 62 (or 63) in accordance with the rolling, pitching and yawing motions of the ship.

In order to calibrate the present equipment preparatory to normal operation, the system is provided with a calibrate-operate switch 33 (Fig. 1), as mentioned above. When armatures 32, 42, 52 of this switch are in their upper or "Operate" position, as shown, the heading, roll and pitch information is supplied to the degaussing current computer in the manner just described. In their lower or "Calibrate" position, the heading, roll and pitch data are disconnected from the computer and the data from synchro generator 96 is substituted for all three. The rotor of generator 96 is set and locked on electrical zero whereby its signal corresponds to the north heading signal received from gyro compass 50 and to the zero pitch and zero roll signals received from vertical gyro 30.

In this setting, the degaussing current computer functions as if the ship were in a level attitude on a north heading, i.e., it sends constant level signals to each of the degaussing coil control channels in accordance with the settings of control knobs 15 and 25 of field coils 8 and 9. When so set, the control knobs of permanent bias control units 83, 88, 89 and magnitude control units 80, 90, 91 may be adjusted as described above, to obtain the required current outputs to the M-, L-, and A-coils in accordance with the ship's degaussing schedule as prescribed by a degaussing station. When these adjustments are complete, armatures 32, 42, 52 of switch 33 are returned to their "Operate" positions and the system is in condition for operation.

For standby operation, the several control signal amplifying channels are provided with identical automatic-manual switches 72, 92 or 93 (Fig. 2), mentioned above, to permit conventional operation of the ship's degaussing coils in the event of a malfunction in the present system. Referring to the M-channel switch 72 (Figs. 2 and 5) as illustrative of all, each switch includes a setting knob 97 whereby wiper arms 71 may be set to an "Auto," "Off," or either of two "Manual" positions. In the latter two positions, wiper arms 71 are connected across a potentiometer 98 that is adjusted by knob 99 and is energized from the ship's D.-C. supply. In the "Auto" position, as shown, the system functions as described above. When automatic operation is not possible, knob 97 is set to "Manual +" or "Manual −," in accordance with the polarity of the signal required to be sent to the generator field coils, and knob 99 is set to obtain the required signal level. Both settings being made as prescribed by the ship's degaussing schedule in accordance with the ship's heading and geographic position. The "Off" position is provided to deenergize the degaussing coils when protection is not required.

Although the present apparatus is described as applied to a minesweeper, it is apparent that numerous modifications may be made within the scope of the invention whereby it may be employed to improve the protection afforded by shipboard degaussing systems in general. Therefore, it is intended that all matter contained in the above description and shown in the drawings shall be interpreted as illustrative and not in a limiting sense.

What is claimed is:

1. In a shipboard degaussing system including a degaussing coil arranged when suitably energized to neutralize an induced magnetic field of a ship and a source of current for energizing said coil, the combination of means for producing an electric field proportional to the earth's magnetic field, means for stabilizing said electric field relative to the magnetic meridian and to the horizontal, a signal pick-off device arranged in said electric field, said pick-off device being fixed with respect to the ship and to said degaussing coil, and means for varying the current supplied to the degaussing coil in accordance with signals generated by the pick-off device.

2. In a shipboard degaussing system including M-, L- and A-coils arranged when suitably energized to neutralize the induced magnetic field of a ship and a source of current for energizing said coils, the combination of means for producing an electric field proportional to the earth's magnetic field, means to stabilize said electric field relative to the magnetic meridian and to the horizontal, a plurality of signal pick-off devices arranged in said electric field, said pick-off devices being fixed with respect to the ship and corresponding in number and relative arrangement to said degaussing coils, and means for varying the current supplied to each degaussing coil in accordance with the signals generated by its respective pick-off device.

3. In a shipboard degaussing system including a degaussing coil arranged when suitably energized to neutralize an induced magnetic field of a ship and a source of current for energizing said coil, the combination of means for producing an electric field having vertical and horizontal components proportional to the corresponding components of the earth's magnetic field, means for stabilizing said electric field relative to the magnetic meridian and to the horizontal, an inductive pick-off device arranged in said electric field, said pick-off device being fixed with respect to the ship and having its axis substantially perpendicular to the plane of said degaussing coil, and means for varying the current supplied to the degaussing coil in accordance with the voltages induced in the pick-off coil.

4. In a shipboard degaussing system including a degaussing coil arranged when suitably energized to neutralize induced and permanent magnetic fields of a ship and a source of current for energizing said coil, the combination of means for producing an electric field proportional to the earth's magnetic field, means for stabilizing said electric field relative to the magnetic meridian and to the horizontal, a signal pick-off device arranged in said electric field, said pick-off device being fixed with respect to the ship and to said degaussing coil whereby the signal generated by the pick-off device is proportional to the current required to be supplied to the degaussing coil to neutralize the induced magnetic field, means for producing a signal proportional to the current required to be supplied to the degaussing coil to neutralize the permanent magnetic field, and means for varying the current supplied to the degaussing coil in accordance with the total of said signals.

5. In a shipboard degaussing system including a degaussing coil arranged when suitably energized to neutralize induced and permanent magnetic fields of a ship and a source of current for energizing said coil, the combination of means for producing an electric field proportional to the earth's magnetic field, means for stabilizing said electric field relative to the magnetic meridian and to the horizontal, a control signal pick-off device arranged in said electric field, said pick-off device being fixed with respect to the ship and to said degaussing coil whereby the control signal generated by the pick-off device is proportional to the current required to be supplied to the degaussing coil to neutralize the induced magnetic field, means for producing a second control signal proportional to the current required to be supplied to the degaussing coil to neutralize the permanent magnetic field, means for combining said control signals, means for varying the current supplied to the degaussing coil in accordance with the total of said control signals, and feedback means for adjusting the magnitude of the total control signal.

6. In a shipboard degaussing system including a degaussing coil arranged when suitably energized to neutralize induced and permanent magnetic fields of the ship and a source of current for energizing said coil, the combination of means for producing an electric field having vertical and horizontal components proportional to the corresponding components of the earth's magnetic field, means for stabilizing said electric field relative to the magnetic meridian and to the horizontal, an inductive pick-off device arranged in said electric field, said pick-off device being fixed with respect to the ship and having its axis substantially perpendicular to the plane of the degaussing coil whereby there is induced in the pick-off device a voltage signal that varies proportionally to the current required to be supplied to the degaussing coil to neutralize the induced magnetic field of the ship, means for producing a voltage signal proportional to the current required to be applied to the degaussing coil to neutralize the permanent magnetic field of the ship, means for combining said voltage signals, and means for varying the current supplied to the degaussing coil in accordance with the total of said combined voltages.

7. In a shipboard degaussing system including a degaussing coil arranged when suitably energized to neutralize induced and permanent magnetic fields of the ship and a source of current for energizing said coil, the combination of means for producing an electric field having vertical and horizontal components proportional to the corresponding components of the earth's magnetic field, means for stabilizing said electric field relative to the magnetic meridian and to the horizontal, an inductive pick-off device arranged in said electric field, said pick-off device being fixed with respect to the ship and having its axis substantially perpendicular to the plane of the degaussing coil whereby there is induced in the pick-off device a voltage signal that varies proportionally to the current required to be applied to the degaussing coil to neutralize the induced magnetic field of the ship, means for producing a voltage signal proportional to the current required to be applied to the degaussing coil to neutralize the permanent magnetic field of the ship, means for combining said voltage signals, means for varying the current supplied to the degaussing coil in accordance with the total of said combined voltages, and means for varying the level of the combined voltage signal to apply a predetermined current to the degaussing coil for a given relationship of such voltage signals.

8. In a shipboard degaussing system including a degaussing coil having its axis substantially parallel with a magnetic axis of the ship and a generator to supply current to said degaussing coil, the combination of a generator control device comprising means for producing an electric field having vertical and horizontal components proportional to the corresponding components of the magnetic field of the earth, means for stabilizing said electric field relative to the magnetic meridian and to the horizontal, an inductive pick-off device arranged in said field, said pick-off device being fixed with respect to the ship and having its axis substantially perpendicular to the axis of said degaussing coil, and means for varying the output of the generator in accordance with the voltages induced in the pick-off device.

9. In a degaussing system including a plurality of degaussing coils arranged when suitably energized to neutralize the magnetic field of a ship and a generating equipment to supply current to said degaussing coils, the combination of a generator control device comprising a vertical set and a horizontal set of Helmholtz coils arranged about a common center, means for stabilizing said coils about said center relative to the magnetic meridian and to the horizontal, means for energizing said coils to produce electric fields proportional respectively to the vertical and horizontal components of the earth's magnetic field, a plurality of pick-off coils fixed relative to the ship and corresponding in number and relative arrangement to the degaussing coils, said pick-off coils having mutual inductance with the Helmholtz coils and having a common center coincident with the common center of the Helmholtz coils, and means for varying the output of the generating equipment in accordance with the voltages induced in the pick-off coils.

10. In a degaussing system including a plurality of degaussing coils arranged when suitably energized to neutralize the magnetic field of a ship and a generating equipment to supply current to said degaussing coils, the combination of a generator control device comprising a vertical set and a horizontal set of Helmholtz coils arranged about a common center, means for stabilizing said coils about said center relative to the magnetic meridian and to the horizontal, means for energizing said sets of coils to produce electric fields proportional respectively to the vertical and horizontal components of the earth's magnetic field, a plurality of pick-off coils fixed relative to the ship and corresponding in number and relative arrangement to the degaussing coils, said pick-off coils having mutual inductance with the Helmholtz coils and having a common center coincident with the common center of the Helmholtz coils, and means for controlling the output of the generating equipment to supply current to each degaussing coil proportionally to the voltage signal induced in its associated pick-off coil.

11. A degaussing current computer for generating signals proportional to the currents $I_M$, $I_L$, $I_A$ required to be supplied respectively to the M-, L-, and A-coils of a ship to neutralize the induced magnetic field of the ship despite rolling, pitching and yawing motions thereof, said computer comprising a vertical set and a horizontal set of Helmholtz coils arranged about a common center, means for stabilizing said coils about said center relative to the magnetic meridian and to the horizontal, means for energizing said coils to produce electric fields proportional respectively to the vertical and horizontal components of the earth's magnetic field, and a plurality of pick-off coils fixed relative to the ship and corresponding in number and relative arrangement to the degaussing coils, said pick-off coils having mutual inductance with the Helmholtz coils and having a common center coincident with the common center of the Helmholtz coils.

12. A degaussing current computer for generating signals proportional to the current required to be supplied to a degaussing coil of a ship to neutralize an induced magnetic field of the ship despite rolling, pitching and yawing motions thereof, said computer comprising a vertical set and a horizontal set of Helmholtz coils arranged about a common center, means for stabilizing said coils about said center relative to the magnetic meridian and to the horizontal, means for energizing said coils to produce an electric field having vertical and horizontal components proportional to the earth's magnetic field, and an inductive pick-off device arranged in said electric field, said pick-off device being fixed with respect to the ship and having an orientation corresponding to that of the degaussing coil.

13. A degaussing current computer for generating signals proportional to the currents $I_M$, $I_L$, $I_A$, required to be supplied respectively to the M-, L-, and A-coils of a ship to neutralize the induced magnetic field of the ship despite rolling, pitching, and yawing motions thereof, in accordance with the equations:

$$I_M \propto Z \cos r \cos p + H \cos a \sin p \cos r - H \sin a \sin r$$
$$I_L \propto -Z \sin p + H \cos a \cos p$$
$$I_A \propto Z \sin r \cos p + H \cos a \sin p \sin r + H \sin a \cos r$$

wherein $a$, $r$ and $p$ are the magnetic heading, roll and pitch angles of the ship, respectively, and $Z$ and $H$ are currents proportional to the vertical and horizontal components of the earth's magnetic field, said computer comprising a vertical set and a horizontal set of Helmholtz coils arranged about a common center, means for stabilizing said coils about said center relative to the magnetic meridian and to the horizontal, means for energizing said coils in accordance with the values $Z$ and $H$ respectively to produce an electric field having vertical and horizontal components proportional to the earth's magnetic field, and a plurality of pick-off coils fixed with respect to the ship and corresponding in numbers and relative arrangement to the degaussing coils, said pick-off coils having mutual inductance with the Helmholtz coils and having a common center coincident with the common center of the Helmholtz coils.

14. In a degaussing system including a degaussing coil arranged when suitably energized to neutralize an induced magnetic field of a ship-borne apparatus and a source of current for energizing said coil, the combination of means for producing an electric field proportional to the earth's magnetic field, means for stabilizing said electric field relative to the magnetic meridian and to the horizontal, a signal pick-off device arranged in said electric field, said pick-off device being fixed with respect to the apparatus and to said degaussing coil, and means for varying the current supplied to the degaussing coil in accordance with signals generated by the pick-off device.

15. In a degaussing system including a plurality of degaussing coils arranged when suitably energized to neutralize the induced magnetic field of a ship-borne apparatus and a source of current for energizing said coils, the combination of means for producing an electric field proportional to the earth's magnetic field, means to stabilize said electric field relative to the magnetic meridian and to the horizontal, a plurality of signal pick-off devices arranged in said electric field, said pick-off devices being fixed with respect to the apparatus and corresponding in number and relative arrangement to said degaussing coils, and means for varying the current supplied to each dgeaussing coil in accordance with the signals generated by its respective pick-off device.

16. In a degaussing system including a degaussing coil arranged when suitably energized to neutralize an induced magnetic field of a ship-borne apparatus and a source of current for energizing said coil, the combination of means for producing an electric field having vertical and horizontal components proportional to the corresponding components of the earth's magnetic field, means for stabilizing said electric field relative to the magnetic meridian and to the horizontal, an inductive pick-off device arranged in said electric field, said pick-off device being fixed with respect to the apparatus and having its axis substantially perpendicular to the plane of said degaussing coil, and means for varying the current supplied to the degaussing coil in accordance with the voltages induced in the pick-off coil.

17. In a shipboard degaussing system including a degaussing coil arranged when suitably energized to neutralize induced and permanent magnetic fields of a ship and a source of current for energizing said coil, the combination of electrical means for producing a field proportional to the earth's magnetic field, means for stabilizing said produced field relative to the magnetic meridian and to the horizontal, a signal pick-off device arranged in said produced field, said pick-off device being fixed with respect to the ship and to said degaussing coil whereby the signal generated by the pick-off device is proportional to the current required to be supplied to the degaussing coil to neutralize the induced magnetic field, means for producing a signal proportional to the current required to be supplied to the degaussing coil to neutralize the permanent magnetic field, and means for varying the current supplied to the degaussing coil in accordance with the total of said signals.

References Cited in the file of this patent

UNITED STATES PATENTS

| 2,421,583 | Stuart | June 3, 1947 |
| 2,519,395 | Perlow | Aug. 22, 1950 |
| 2,648,042 | Klein et al. | Aug. 4, 1953 |